(12) United States Patent
Nishimoto et al.

(10) Patent No.: US 8,603,265 B2
(45) Date of Patent: Dec. 10, 2013

(54) NI-BASED ALLOY HIGH-CHROME STEEL STRUCTURE AND MANUFACTURING METHOD OF THE SAME

(75) Inventors: Shin Nishimoto, Tokyo (JP); Takashi Nakano, Tokyo (JP); Yoshinori Tanaka, Tokyo (JP); Tatsuaki Fujikawa, Tokyo (JP); Kenji Kawasaki, Hyogo (JP); Yoshikuni Kadoya, Hyogo (JP); Ryuichi Yamamoto, Hyogo (JP); Yuichi Hirakawa, Hyogo (JP); Takashi Shige, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 635 days.

(21) Appl. No.: 12/673,414

(22) PCT Filed: Jun. 11, 2009

(86) PCT No.: PCT/JP2009/061065
§ 371 (c)(1),
(2), (4) Date: Mar. 9, 2010

(87) PCT Pub. No.: WO2009/154245
PCT Pub. Date: Dec. 23, 2009

(65) Prior Publication Data
US 2011/0126945 A1  Jun. 2, 2011

(30) Foreign Application Priority Data

Jun. 18, 2008 (JP) ................................ 2008-159261

(51) Int. Cl.
*C21D 1/00* (2006.01)
*C21D 9/00* (2006.01)
*C21D 6/00* (2006.01)
*B23K 31/02* (2006.01)
*B32B 15/18* (2006.01)

(52) U.S. Cl.
USPC .......................................... 148/530; 148/400

(58) Field of Classification Search
USPC ................................................. 148/530, 400
See application file for complete search history.

(56) References Cited

U.S. PATENT DOCUMENTS 6,152,697 A    11/2000  Konishi et al.
6,753,504 B2   6/2004   Keller et al.
(Continued)

FOREIGN PATENT DOCUMENTS

CN    101158289    4/2008
JP    58-103972    6/1983
(Continued)

OTHER PUBLICATIONS

English Abstract of Kikuchi et al. (JP 2007-321630) (Dec. 13, 2007).*

(Continued)

*Primary Examiner* — Jessee Roe
(74) *Attorney, Agent, or Firm* — Wenderoth, Lind & Ponack, L.L.P.

(57) ABSTRACT

There are provided an Ni-based alloy high-chrome steel structure and its manufacturing method capable of joining Ni-based alloys and high-chrome steels by welding, and performing suitable heat treatment, thereby maintaining the strength in the joints. In a manufacturing method of a structure formed by joining together at least two first members formed from Ni-based alloys by welding, and joining a second member formed from high-chrome steels to a member where the first members have been joined together, the manufacturing method includes the steps: joining together the at least two first members formed from Ni-based alloys by welding; performing first-stage aging treatment on a welded joint between the first members, and then, joining the second member formed from high-chrome steels to the member where the first members have been joined together by welding; and then, performing second-stage aging treatment on the welded joint between the first members, and performing heat treatment after welding on a welded portion between the first members and the second member.

18 Claims, 3 Drawing Sheets

(56) References Cited

U.S. PATENT DOCUMENTS

| | | |
|---|---|---|
| 2005/0106012 A1 | 5/2005 | Scarlin |
| 2007/0253812 A1 | 11/2007 | Yamashita |
| 2008/0085192 A1 | 4/2008 | Fukuda et al. |
| 2009/0123290 A1 | 5/2009 | Imano et al. |
| 2010/0296938 A1 | 11/2010 | Nishimoto et al. |

FOREIGN PATENT DOCUMENTS

| | | |
|---|---|---|
| JP | 8-170132 | 7/1996 |
| JP | 2000-64805 | 2/2000 |
| JP | 2000-282808 | 10/2000 |
| JP | 2002-121654 | 4/2002 |
| JP | 2002-307169 | 10/2002 |
| JP | 2003-013161 | 1/2003 |
| JP | 2005-121023 | 5/2005 |
| JP | 2006-291344 | 10/2006 |
| JP | 2007-291966 | 11/2007 |
| JP | 2007-321630 | 12/2007 |
| JP | 2008-88525 | 4/2008 |
| JP | 2008-93668 | 4/2008 |
| JP | 2010-65547 | 3/2010 |

OTHER PUBLICATIONS

English Abstract of Arai et al. (JP 2008-093668) (Apr. 24, 2008).*
English Abstract of Arai et al. (JP 2002-121654) (Apr. 26, 2002).*
English Abstract of CN 101158289 (Apr. 9, 2008).*
English Abstract of Konno et al. (JP 210-065547) (Mar. 25, 2010).*
International Preliminary Report on Patentability and Written Opinion of the International Searching Authority issued Feb. 17, 2011 in International (PCT) Application No. PCT/JP2009/061065.
International Search Report issued Sep. 15, 2009 in International (PCT) Application No. PCT/JP2009/061065.
International Search Report issued Sep. 29, 2009 in International (PCT) Application No. PCT/JP2009/061058.
International Preliminary Report on Patentability and Written Opinion of the International Searching Authority issued Feb. 17, 2011 in International (PCT) Application No. PCT/JP2009/061058.
Japanese Office Action issued Jul. 13, 2012 in corresponding Japanese Patent Application No. 2010-502366 with English translation.
Korean Notice of Allowance dated Sep. 26, 2012 issued in corresponding Korean Patent Application No. 10-2010-7002531 with English translation.
Chinese Notification of Fulfilling of Registration Formality dated Feb. 1, 2013 issued in corresponding Chinese Patent Application No. 200980100052.3 with English translation.
Korean Notice of Allowance dated Aug. 22, 2012 issued in corresponding Korean Patent Application No. 10-2010-7001474 with English translation.
Japanese Notice of Allowance dated Jan. 16, 2012 issued in corresponding Japanese Patent Application No. 2010-517953 with English translation.

* cited by examiner

NI-BASED ALLOY HIGH-CHROME STEEL STRUCTURE AND MANUFACTURING METHOD OF THE SAME

TECHNICAL FIELD

The present invention relates to an Ni-based alloy high-chrome steel structure which mainly constitutes members which contact high-temperature fluids of rotors, casings, etc., of steam turbines, gas turbines, etc., and its manufacturing method.

BACKGROUND ART

The three methods of atomic power, thermal power, and hydraulic power are now used as main power generation methods, and from a viewpoint of resource quantity and energy density, the three power generation methods are also expected to be used as the main power generation methods in the future. Especially, since thermal power generation is safe, its utility value is high as a power generation method with high capacity to respond to load change, it is expected that thermal power generation also will also continue to play an important role in the power generation field in the future.

In coal-fired thermal power generation including steam turbines, improvement of efficiency has been advanced since before. Generally, power generation is now performed under steam conditions of 600° C. class or less, and high-chrome steels (ferritic heat-resisting steels), such as 12Cr steel which has thermal resistance to the steam temperature, are used for primary members, such as turbine rotors and moving blades.

Additionally, although power generation techniques which have adopted steam conditions of the 700° C. class have recently been demanded for $CO_2$ emissions reduction and further improvements in thermal efficiency, when steam conditions of the 700° C. class are adopted, strength becomes insufficient in the high-chrome steels (ferritic heat resisting steels), such as the 12Cr steel.

Thus, it is conceivable that Ni-based alloys which have still higher high-temperature strength are applicable as material for turbine rotors. However, since the manufacturing of a large-sized ingot of Ni-based alloys is difficult, enlargement of the turbine rotor is difficult, and very expensive. Therefore, it is not realistic to manufacture the turbine rotor using only Ni-based alloys.

Thus, Patent Document 1 discloses a turbine rotor provided in a steam turbine into which high-temperature steam of 650° C. or higher is introduced, as a turbine rotor which is made of Ni-based alloys but uses the Ni-based alloys for essential parts and uses iron and steel materials only for other parts. Here, the turbine rotor is constructed such that a part divided into a portion made of the Ni-based alloys and a portion made of CrMoV steels according to steam temperature is connected by welding, and the steam temperatures of a connecting portion between the portion made of the Ni-based alloy and the portion made of the CrMoV steels, and the steam temperature of the portion made of the CrMoV steels are maintained at 580° C. or lower. Additionally, the CrMoV steels include low CrMoV steels which contain 0.85 to 2.5% of Cr by weight %.

However, in the technique disclosed in Patent Document 1, the CrMoV steels include low CrMoV steels which contain 0.85 to 2.5% of Cr by weight %. Thus, in the low CrMoV steels, it is expected that thermal resistance is insufficient in parts other than the part made of the Ni-based alloy, and when being used for a high-temperature steam turbine or a high-temperature gas turbine, it is necessary to use high-chrome steels, such as 12Cr steel, instead of the low CrMoV steels.

Additionally, in order to ensure the strength of the joint after welding, it is necessary to perform suitable processing after welding. However, in Patent Document 1, heat treatment is not disclosed, and it is unknown whether or not it is possible to ensure the strength of the welded joint.

RELATED ART DOCUMENT

Patent Document
[Patent Document 1] Japanese Patent Application Laid-Open No. 2008-88525

SUMMARY OF THE INVENTION

Accordingly, the invention was made in view of the problems of this conventional technique, and the object of the invention is to provide an Ni-based alloy high-chrome steel structure and its manufacturing method capable of joining Ni-based alloys and high-chrome steels by welding, and performing suitable heat treatment, thereby maintaining the strength in the joints.

In order to solve the above problems, the invention provides a manufacturing method of a structure formed by joining together at least two first members formed from Ni-based alloys by welding, and joining a second member formed from high-chrome steels to a member where the first members have been joined together. The manufacturing method includes the steps: joining together the at least two first members formed from Ni-based alloys by welding; performing first-stage aging treatment on the welded joint between the first members, and then, joining a second member formed from high-chrome steels to the member where the first members have been joined together by welding; and then, performing second-stage aging treatment on the welded joint between the first members, and performing heat treatment after welding on the welded portion between the first members and the second member.

Additionally, the invention provides a manufacturing method of a structure constructed by joining together at least two first members formed from Ni-based alloys by welding, and a second member formed from high-chrome steels to a member where the first members have been joined together. The manufacturing method includes the steps: joining together the at least two first members formed from Ni-based alloys by welding; and performing first-stage aging treatment and second-stage aging treatment on a welded joint between the first members, then joining the second member formed from high-chrome steels to the member where the first members have been joined together by welding, and performing heat treatment after welding on a welded portion.

Since the first members, and the welded portion between the first members and the second member are brought into a quenched state as welded, the heat treatment after welding according to each joint is indispensable in order to ensure the strength property of the welded joint. Therefore, in the welded portion between the Ni-based alloys, i.e., the welded portion between the first members, it is possible to ensure the strength of the welded portion by performing the first-stage and second-stage aging treatments, and performing heat treatment after welding in the welded portion between the Ni-based alloys and the high-chrome steel, i.e., between the first members and the second member.

Additionally, the temperature of the second-stage aging treatment performed on the welded joint between the first members, and the temperature of the heat treatment after welding performed on the welded portion between the first members and the second member may be set to the same temperature, and the second-stage aging treatment and the heat treatment after welding may be simultaneously performed.

When the first members are Ni-based alloys and the second member is high-chrome steel, the temperature condition of the second-stage aging treatment, and the temperature condition of the heat treatment after welding of the welded portion between the first members and the second member are substantially the same.

Thus, it is possible to shorten the time required for heat treatment by welding the first members and the second member, and simultaneously performing the second-stage aging treatment of the welded joint between the first members, and the heat treatment after welding, after the first-stage aging treatment is performed.

In addition, in this case, when heat treatment is not locally performed only on the welded joint between the first members, and the welded portion between the first members and the second member but the whole Ni-based alloy high-chrome structure is heat-treated, this is even effective for prevention of dispersion in residual stress, or deformation.

Additionally, the first-stage aging treatment of the welded joint between the first members may be performed at 700 to 1000° C., and the second-stage aging treatment, and the heat treatment after welding of the welded portion between the first members and the second member may be performed at 600 to 800° C.

It is possible to give sufficient strength to each welded portion by performing heat treatment in such a temperature range.

Additionally, the at least two first members may be joined together by welding; the first-stage aging treatment on the welded joint between the first members may be performed, then the second member formed from high-chrome steels may be joined to the member where the first members have been joined together by welding, and a third member formed from low-chrome steels may be joined to the second member by welding; and then, the second-stage aging treatment on the welded joint between the first members, the heat treatment after welding on the welded portion between the first members and the second member, and the heat treatment after welding on the welded portion between the second member and the third member may be performed.

As well as the Ni-based alloys and the high-chrome steels, if needed, it is possible to weld and join low-chrome steels. For example, in the rotor of a steam turbine, it is necessary to use the Ni-based alloys which have high thermal resistance in the vicinity through which high-temperature steam passes. However, since such a high thermal resistance is unnecessary in the vicinity of the end, the low-chrome steels are enough. Therefore, in a case where the Ni-based alloy high-chrome steel structure of the invention is used for the rotor of the steam turbine, it is possible to reduce the material cost of the whole rotor (Ni-based alloy high-chrome steel structure) by partially using low-chrome steels, without any problems from the viewpoint of heat resistance even if the ends are made of the low-chrome steels.

Additionally, the temperature of the second-stage aging treatment performed on the welded joint between the first members, the temperature of the heat treatment after welding performed on the welded portion between the first members and the second member, and the temperature of the heat treatment after welding performed on the welded portion between the second member and the third member may be set to the same temperature, and the second-stage aging treatment and each of the heat treatments after welding may be simultaneously performed.

When the first members are Ni-based alloys, the second member is high-chrome steel, and the third member is low-chrome steel, the temperature condition of the second-stage aging treatment, the temperature condition of the heat treatment after welding of the welded portion between the first members and the second member, and the temperature condition of the heat treatment after welding of the welded portion between the second member and the third member are substantially the same.

Thus, it is possible to shorten the time required for heat treatment by welding the first members and the second member, and simultaneously performing the second-stage aging treatment of the welded joint between the first members, and each of the heat treatments after welding (the heat treatment after welding of the welded portion between the first members and the second member, and the heat treatment after welding of the welded portion between the second member and the third member), after the first-stage aging treatment is performed.

In addition, in this case, when heat treatment is not locally performed only on the welded joint between the first members, the welded portion between the first members and the second member, and the welded portion between the second member and the third member, but the whole Ni-based alloy high-chrome structure is heat-treated, this is even effective for prevention of dispersion in residual stress, or deformation.

Additionally, the first-stage aging treatment of the welded joint between the first members may be performed at 700 to 1000° C., and the second-stage aging treatment, the heat treatment after welding of the welded portion between the first members and the second member, and the heat treatment after welding of the welded portion between the second member and the third member may be performed at 600 to 800° C.

It is possible to give sufficient strength to each welded portion by performing heat treatment in such a temperature range.

Additionally, as the invention of the structure for solving the above problems, there is provided a structure formed by joining together at least two first members formed from Ni-based alloys by welding, and joining a second member formed from high-chrome steels to the member where the first members have been joined together. The structure is formed by joining together the at least two first members formed from Ni-based alloys by welding; performing first-stage aging treatment on the welded joint between the first members, and then, joining the second member formed from high-chrome steels to the member where the first members have been joined together by welding; and performing second-stage aging treatment on the welded joint between the first members, and performing heat treatment after welding on the welded portion between the first members and the second member.

Additionally, the invention provides a structure constructed by joining together at least two first members formed from Ni-based alloys by welding, and a second member formed from high-chrome steels to a member where the first members have been joined together. The structure is formed by joining together the at least two first members formed from Ni-based alloys by welding; and performing first-stage aging treatment and second-stage aging treatment on a welded joint between the first members, then joining the second member formed from high-chrome steels to the member where the first members have been joined together by welding, and performing heat treatment after welding on the welded portion.

The Ni-based alloy high-chrome steel structure of the invention may be formed by joining together the at least two first members by welding; performing the first-stage aging treatment on the welded joint between the first members, then joining the second member formed from high-chrome steels to the member where the first members have been joined together by welding, and joining a third member formed from low-chrome steels to the second member by welding; and then, performing the second-stage aging treatment on the welded joint between the first members, the heat treatment after welding on the welded portion between the first members and the second member, and the heat treatment after welding on the welded portion between the second member and the third member.

Additionally, the Ni-based alloy high-chrome steel structure of the invention may be formed by performing the first-stage aging treatment of the welded joint between the first members at 700 to 1000° C., and performing the second-stage aging treatment, the heat treatment after welding of the welded portion between the first members and the second member, and the heat treatment after welding of the welded portion between the second member and the third member at 600 to 800° C.

Moreover, the Ni-based alloy high-chrome steel structure of the invention may be used for the configuration of a rotor or casing of a rotary appliance into which a working fluid that is steam or combustion gas is introduced.

According to the invention as described above, it is possible to provide an Ni-based alloy high-chrome steel structure and its manufacturing method capable of joining Ni-based alloys and high-chrome steels by welding, and performing suitable heat treatment, thereby maintaining the strength in the joints.

DETAILED DESCRIPTION OF THE PREFERRED EMBODIMENT

Preferred examples of the invention will be illustratively described below in detail with reference to the drawings. Here, the dimensions, materials, shapes, relative arrangements, etc. of component parts described in this example are not meant to limit the scope of the invention, but are merely simple explanatory examples, as long as there is no specific description of limitations.

EXAMPLE 1

Figure 1:
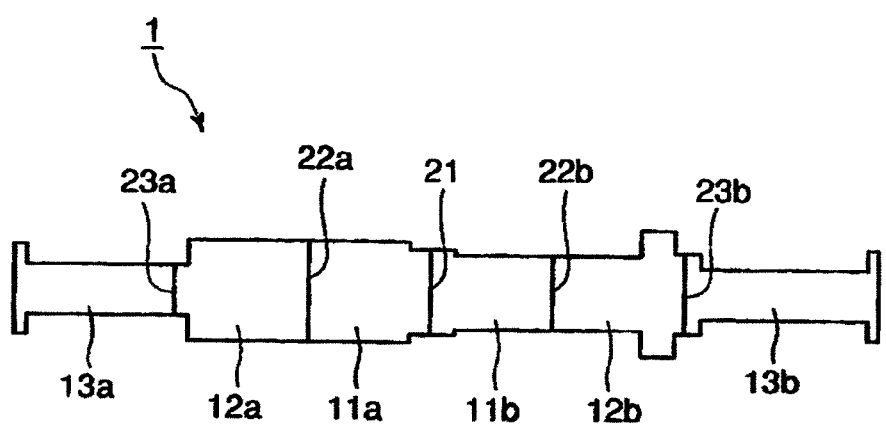
FIG. 1 is a plan view schematically illustrating the configuration of a turbine rotor formed from an Ni-based alloy high-chrome steel structure of the invention according to Example 1.

FIG. 1 is a plan view schematically illustrating the configuration of a turbine rotor 1 formed from an Ni-based alloy high-chrome steel structure of the invention according to Example 1.

(Configuration)

First, the configuration of a turbine rotor according to Example 1 used for a steam turbine into which the steam of 650° C. or higher is introduced will be described using FIG. 1.

As shown in FIG. 1, the turbine rotor 1 includes two Ni-based alloy portions 11a and 11b, two high-chrome steel portions 12a and 12b, and two low-chrome steel portions 13a and 13b.

The two Ni-based alloy portions 11a and 11b are joined together by welding to form a welded joint 21, the two Ni-based alloy portions 11a and 11b are joined to the high-chrome steel portions 12a and 12b, respectively, by welding to form welded joints 22a and 22b, respectively, and the high-chrome steel portions 12a and 12b are joined to the low-chrome steel portions 13a and 13b, respectively, by welding to form welded joint 23a and 23b, respectively, whereby a turbine rotor 1 is formed which is integrated in order of the low-chrome steel portion 13a, the welded joint 23a, the high-chrome steel portion 12a, the welded joint 22a, the Ni-based alloy portion 11a, the welded joint 21, the Ni-based alloy portion 11b, the welded joint 22b, the high-chrome steel portion 12b, the welded joint 23b, and the low-chrome steel portion 13b from one end.

Additionally, the Ni-based alloy portions 11a and 11b and the welded joint 21 are arranged in positions exposed to the steam with a temperature of 650° C. or higher, the welded joints 22a and 22b and the high-chrome steel portions 12a, and 12b are arranged in positions exposed to the steam with a temperature of 650° C. or lower, and the welded joints 23a and 23b and low-chrome steel portions 13a, and 13b are arranged in positions of a still lower temperature. It is also possible to set these arrangement temperatures to other temperatures if the arrangement temperatures are equal to or lower than a high-temperature limit at which it is possible to stably use materials which constitute the respective parts.

(Materials)

Next, the materials for the Ni-based alloy portions 11a and 11b which constitute the turbine rotor 1, the high-chrome steel portions 12a and 12b, and the low-chrome steel portions 13a and 13b will be described.

(A) Ni-Based Alloy Portion

The Ni-based alloy portions are preferably formed from Ni-based alloys which have thermal resistance capable of being stably used even at a temperature of 650° C. or higher, preferably about 700° C. and which have a mean linear expansion coefficient of $12.4 \times 10^{-6}/°$ C. to $15.5 \times 10^{-6}/°$ C. within a temperature range from a room temperature (also referred to as "normal temperature" which is the same hereinbelow) to 700° C. By using the Ni-based alloys which have a linear expansion coefficient within the above range, a difference in the linear expansion coefficient between the Ni-based alloy portions 11a and 11b and the high-chrome steel portions 12a and 12b becomes small. Therefore, thermal stress applied to the welded joints 22a and 22b between the Ni-based alloy portions 11a and 11b and the high-chrome steel portions 12a and 12b also becomes small. Accordingly, it becomes easy to secure the strength in the welded joints.

Examples of the Ni-based alloys which have a linear expansion coefficient of $12.4 \times 10^{-6}/°$ C. to $15.5 \times 10^{-6}/°$ C. includes materials having chemical composition ranges of (1) to (6) are summarized in Table 1.

In addition, the Ni-based alloys are not limited the ranges of (1) to (6), and may have other compositions if the Ni-based alloys are Ni-based alloys which have thermal resistance capable of being stably used even at a temperature of 650° C. or higher, preferably about 700° C. and which have a linear expansion coefficient of $12.4 \times 10^{-6}/°$ C. to $15.5 \times 10^{-6}/°$ C. within a temperature range from a room temperature) to 700° C.

TABLE 1

| | (1) | (2) | (3) | (4) | (5) | (6) |
|---|---|---|---|---|---|---|
| C | ≤0.15% | ≤0.15% | ≤0.15% | ≤0.15% | 0.05 to 0.15% | ≤0.1% |
| Si | ≤1% | ≤1% | ≤1% | ≤1% | ≤1% | ≤0.5% |
| Mn | ≤1% | ≤1% | ≤1% | ≤1% | ≤1% | ≤0.5% |
| Cr | 5 to 15% | 5 to 20% | 5 to 20% | 5 to 20% | 20 to 24% | 20 to 23% |
| Mo | (Refer to the following) | 17 to 26% | (Refer to the following) | (Refer to the following) | 8 to 10% | 8 to 10% |
| W | (Refer to the following) | (Refer to the following) | (Refer to the following) | ≤10% | | |
| Re | (Refer to the following) | (Refer to the following) | (Refer to the following) | (Refer to the following) | | |
| Al | 0.2 to 2% | 0.1 to 2% | 0.1 to 2% | 0.1 to 2.5% | 0.8 to 1.5% | ≤0.4% |
| Ti | 0.5 to 4.5% | 0.1 to 2% | 0.1 to 2% | 0.10 to 0.95% | ≤0.6% | ≤0.4% |
| Nb | | | (Refer to the following) | (Refer to the following) | | (Refer to the following) |
| Ta | | | (Refer to the following) | (Refer to the following) | | (Refer to the following) |
| B | ≤0.02% | ≤0.02% | 0.001 to 0.02% | 0.001 to 0.02% | ≤0.006% | ≤0.006% |
| Zr | ≤0.2% | ≤0.2% | 0.001 to 0.2% | 0.001 to 0.2% | | |
| Fe | ≤10% | ≤10% | ≤10% | ≤4% | ≤3% | ≤5% |
| Ni | Bal. | Bal. | Bal. | Bal. | ≥44.5% | ≥58% |
| Co | | | ≤5% | | 10 to 15% | ≤1% |
| Other conditions | In at least one or two kinds of Mo, W, and Re, Mo + (W + Re)/2: 17 to 25% Atomic % of Al + Ti is 2.5 to 7.0% One or two kinds of B and Zr are contained | 17 ≤ Mo + (W + Re)/2 ≤ 27 Atomic % of Al + Ti is 1 to 5.5% | In at least one or two kinds of Mo, W, and Re, Mo + (W + Re)/2: 17 to 27% Nb + Ta/2 ≤ 1.5% | In at least one or two kinds of Mo, W, and Re, Mo + (W + Re)/2: 5 to 20% Nb + Ta/2 ≤ 1.5% Atomic % of Al + Ti + NB + Ta is 2.0 to 6.5% | S ≤ 0.015% Cu ≤ 0.5% | S ≤ 0.015% P ≤ 0.015% Nb + Ta: 3.15 to 4.15% |

% in Table 1 means weight %.

Additionally, although inevitable impurities are also contained in the Ni-based alloys with the compositions of (1) to (6) in Table 1, it is more preferable that the content thereof be closer to 0%.

(B) High-Chrome Steel Portion

The high-chrome steel portions are preferably formed from high-chrome steels which have thermal resistance capable of being stably used up to a temperature of about 650° C. and which have a mean linear expansion coefficient of $11.2 \times 10^{-6}$/° C. to $12.4 \times 10^{-6}$/° C. within a temperature range from a room temperature to 700° C. By using the Ni-based alloys which have a linear expansion coefficient within the above range, the difference in linear expansion coefficient between the Ni-based alloy portions 11a and 11b and the high-chrome steel portions 12a and 12b becomes small. Therefore, thermal stress applied to the welded joints 22a and 22b between the Ni-based alloy portions 11a and 11b and the high-chrome steel portions 12a and 12b also becomes small. Accordingly, it becomes easy to secure sufficient strength in the welded joints.

The high-chrome steels which have a linear expansion coefficient of $11.2 \times 10^{-6}$/° C. to $12.4 \times 10^{-6}$/° C. includes materials having chemical composition ranges of (7) and (8) are summarized in Table 2.

In addition, the high-chrome steels are not limited the ranges of (7) and (8), and may have other compositions if the high-chrome steels are high-chrome steels which have thermal resistance capable of being stably used up to a temperature of about 650° C. and which have a mean linear expansion coefficient of $11.2 \times 10^{-6}$/° C. to $12.4 \times 10^{-6}$/° C. within a temperature range from a room temperature) to 700° C.

12Cr steel which is generally used for the turbine rotor is also contained in the high-chrome steels of such ranges, and 12Cr steel which has conventionally been used for the turbine rotor is able to be used as the high-chrome steels.

TABLE 2

| | (7) | (8) |
|---|---|---|
| C | ≥0.10% | 0.08 to 0.25% |
| Si | ≤0.10% | ≤0.10% |
| Mn | 0.05% to 1.5% | ≤0.10% |
| Ni | ≤1.5% | 0.05% to 1.0% |
| Cr | 7 to 10% | 10 to 12.5% |
| Mo | (Refer to the following) | 0.6 to 1.9% |
| W | (Refer to the following) | 1.0 to 1.95% |
| V | 0.10 to 0.30% | 0.10 to 0.35% |
| Nb | 0.02 to 0.10% | 0.02 to 0.10% |
| N | 0.01 to 0.07% | 0.01 to 0.08% |
| Al | ≤0.02% | |
| B | | 0.001 to 0.01% |
| Co | | 2.0 to 8.0% |
| Fe | Bal. | Bal. |
| Other conditions | Contain amount inside straight line (straight line is not included) which connects | |

TABLE 2-continued

| (7) | (8) |
|---|---|
| A (1.75% Mo, 0.0% W), | |
| B (1.75% Mo, 0.5% W), | |
| C (1.53% Mo, 0.5% W), | |
| D (1.3% Mo, 1.0% W), | |
| E (2.0% Mo, 1.0% W), | |
| F (2.5% Mo, 0.5% W), | |
| G (2.5% Mo, 0.0% W), | |
| AND A | |

% in Table 2 means weight %.

Additionally, although inevitable impurities are also contained in the high-chrome steels with the compositions of (7) and (8) in Table 2, it is more preferable that the content thereof be closer to 0%.

(C) Low-Chrome Steel Portion

The low-chrome steel portions may be those which have thermal resistance capable of being stably used up to a temperature from which the low-chrome steel portions having a lower temperature than the high-chrome steel portions rise, and include, for example, 2.25CrMoV steel or CrMoV steel.

In addition, the low-chrome steel portions are not limited to 2.25CrMoV steel or CrMoV steel, and may have other compositions if the low-chrome steels are low-chrome steels which have thermal resistance capable of being stably used even at temperatures from which the low-chrome steel portions having a lower temperature than the high-chrome steel portions rise.

(Manufacturing Method)

Next, a manufacturing method of the turbine 1 according to Example 1 will be described referring to FIGS. 1 and 2.

Figure 2:
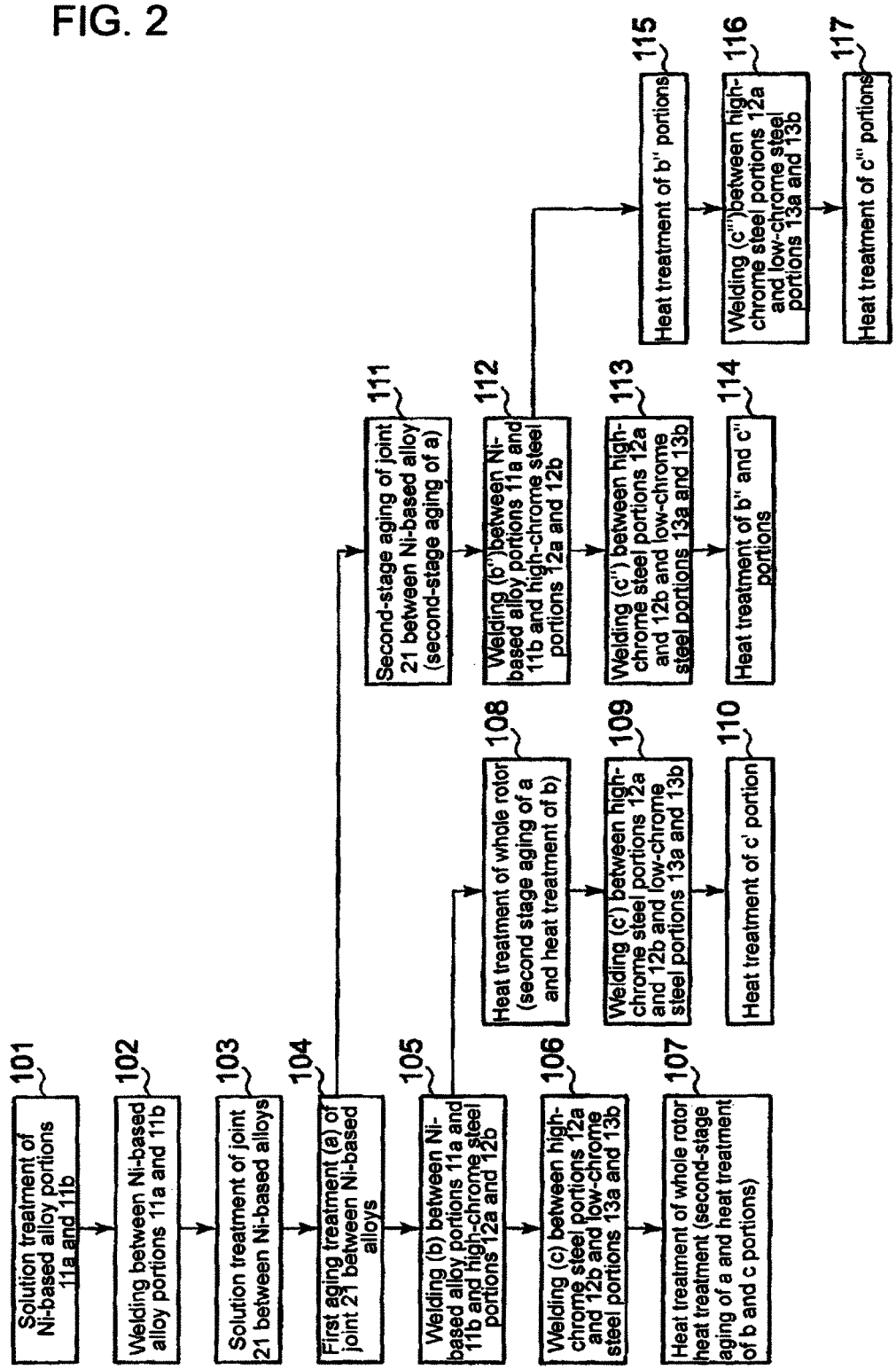
FIG. 2 is a schematic diagram illustrating the manufacturing process of the turbine rotor according to Example 1.

FIG. 2 is a schematic diagram illustrating the manufacturing process of the turbine 1 according to Example 1.

Four types of manufacturing processes are shown by a schematic diagram in FIG. 2, and a first manufacturing process is a process of 101→102→103→104→111→112→115→116→117, a second manufacturing process is a process of 101→102→103→104→111→112→113→114, a third manufacturing process is a process of 101→102→103→104→105→108→109→110, and a fourth manufacturing process is 101→102→103→104→105→106→107.

The manufacturing process will be sequentially described below from the first manufacturing process.

(A) First Manufacturing Process

In the first manufacturing process, first, solution treatment of the Ni-based alloy portions 11*a* and 11*b* is performed in 101.

Next, the Ni-based alloy portions are welded in 102, and if needed, solution treatment of the joint 21 between the Ni-based alloys is carried out in 103. Next, (a) first-stage aging of the joint 21 between the Ni-based alloys is performed in 104. The first-stage aging is performed within a range of 700 to 1000° C.

When the first-stage aging is finished in 104, second-stage aging of the joint 21 (*a*) between the Ni-based alloys which has finished the first-stage aging is subsequently performed in 111. The second-stage aging is carried out at 600 to 800° C.

When the second-stage aging is finished in 111, the Ni-based alloy portions 11*a* and 11*b* and the high-chrome steel portions 12*a* and 12*b* are welded together (b") in 112, and heat treatment of the welded portions (b") is carried out in 115. This heat treatment is carried out at 600 to 800° C.

When the heat treatment of the welded portions (b") between the Ni-based alloy portions 11*a* and 11*b* and the high-chrome steel portions 12*a* and 12*b* are finished in 115, the high-chrome steel portions 12*a* and 12*b* and the low-chrome steel portions 13*a* and 13*b* are welded together (c''') in 116, and heat treatment is performed on the welded portions (c''') in 117. This heat treatment is carried out at 600 to 800° C.

By the above steps of 101 to 117, the first-stage aging (104) and the second-stage aging (111) are performed on the welded portions between the Ni-based alloys, the heat treatment (115) after welding is performed on the welded portions between the Ni-based alloys and the high-chrome steels, and the heat treatment (117) after welding is performed on the welded portions between the high-chrome steels and the low-chrome steels, so that it is possible to manufacture a rotor in which sufficient strength is given even to the welded joints.

(B) Second Manufacturing Process

Since the second manufacturing process is the same as the first manufacturing process until 112 in FIG. 2, the description thereof is omitted.

When the Ni-based alloy portions 11*a* and 11*b* and the high-chrome steel portions 12*a* and 12*b* are welded together (b"), respectively, in 112, the high-chrome steel portions 12*a* and 12*b* and the low-chrome steel portions 13*a* and 13*b* are then welded together (c"), respectively, in 113.

When the welding (c") is finished in 113, heat treatment is performed on the welded portions (b") between the Ni-based alloy portions 11*a* and 11*b* and the high-chrome steel portions 12*a* and 12*b*, and the welded portions (c") between the high-chrome steel portions 12*a* and 12*b* and the low-chrome steel portions 13*a* and 13*b* in 114. This heat treatment is carried out at 600 to 800° C.

The rotor 1 is manufactured by the above steps.

In the second manufacturing process, heat treatment was simultaneously carried out in 114 after welding was performed in 112 and 113, by utilizing that the heat treatment of the welded portions between the Ni-based alloy portions 11*a* and 11*b* and the high-chrome steel portions 12*a* and 12*b* and the heat treatment of the welded portions between the high-chrome steel portions 12*a* and 12*b* and the low-chrome steel portions 13*a* and 13*b* can be carried out at the same temperature.

Thereby, the manufacture of the turbine rotor 1 becomes possible in a shorter time than the first manufacturing process.

(C) Third Manufacturing Process

Since the third manufacturing process is the same as the first and second manufacturing process until 104 in FIG. 2, the description thereof is omitted.

When the first-stage aging treatment of the joint 21 between the Ni-based alloys is finished in 104, the Ni-based alloy portions 11*a* and 11*b* and the high-chrome steel portions 12*a* and 12*b* are welded together (b), respectively, in 105. When the welding is finished, heat treatment is performed on the whole rotor at 600 to 800° C. in 108. Thereby, the second-stage aging of the joint 21 between the Ni-based alloys is accomplished, and the heat treatment after the welding of the welded portions between the Ni-based alloy portions and the high-chrome steel portions are also accomplished.

When the heat treatment is finished in 108, the high-chrome steel portions 12*a* and 12*b* and the low-chrome steel portions 13*a* and 13*b* are welded together (c') in 109, and heat treatment is performed on the welded portions (c') at 600 to 800° C. in 110.

The rotor 1 is manufactured by the above steps.

In the third manufacturing process, the second-stage aging and heat treatment were simultaneously carried out in 108, by utilizing that the second-stage aging of the joint between the Ni-based alloy portions, and the heat treatment of the welded portions between the Ni-based alloy portions 11a and 11b and the high-chrome steel portions 12a and 12b can be carried out at the same temperature. Thereby, the manufacture of the turbine rotor 1 becomes possible in a shorter time than the first manufacturing process. Additionally, heat-treating the whole rotor in 108 is effective also for prevention of dispersion in residual stress, or deformation.

(D) Fourth Manufacturing Process

Since the fourth manufacturing process is the same as the third manufacturing process until 105 in FIG. 2, the description thereof is omitted.

When the Ni-based alloy portions 11a and 11b and the high-chrome steel portions 12a and 12b are welded together (b), respectively, in 105, the high-chrome steel portions 12a and 12b and the low-chrome steel portions 13a and 13b are then welded together (c), respectively, in 106. When the welding is finished, heat treatment is performed on the whole rotor at 600 to 800° C. Thereby, the second-stage aging of the joint 21 between the Ni-based alloys is accomplished, the heat treatment after the welding of the welded portions between the Ni-based alloy portions and the high-chrome steel portions are also accomplished, and the heat treatment after the welding of the welded portions between the high-chrome steel portions and the low-chrome steel portions is also accomplished.

The rotor 1 is manufactured by the above steps.

In the fourth manufacturing process, the second-stage aging and heat treatment was simultaneously carried out in 107 by utilizing that the second-stage aging of the joint between the Ni-based alloy portions, the heat treatment of the welded portions between the Ni-based alloy portions 11a and 11b and the high-chrome steel portions 12a and 12b, and the heat treatment of the welded portions between the high-chrome steel portions 12a and 12b and the low-chrome steel portions 13a and 13b can be carried out at the same temperature. Thereby, the manufacture of the turbine rotor 1 becomes possible in a shorter time than the first to third manufacturing processes, and heat-treating the whole rotor in 107 is effective also for prevention of dispersion in residual stress, or deformation.

EXAMPLE 2

Figure 3:
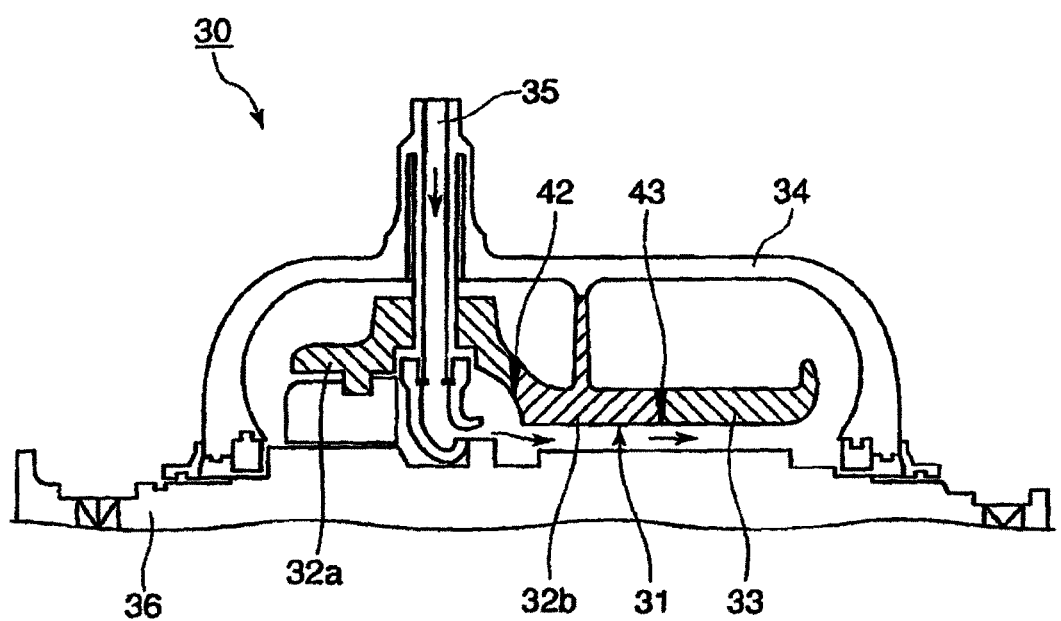
FIG. 3 is a top sectional view of a steam turbine including an inner casing formed from the Ni-based alloy high-chrome steel structure of the invention according to Example 2.

FIG. 3 is a upper sectional view of a steam turbine including an inner casing formed from the Ni-based alloy high-chrome steel structure of the invention according to Example 2.

The inner casing will be described below.

(Configuration)

As shown in FIG. 3, a steam turbine 30 includes a dual-structure casing having an inner casing 31 and an outer casing 34 provided outside the inner casing. Additionally, a turbine rotor 36 is provided within the inner casing 33 so as to pass therethrough. Additionally, a main steam pipe 35 is provided in the steam turbine 30 so as to pass through the outside casing 34 and the inner casing 31, and the steam introduced from the main steam pipe 35 pass through between vanes (not shown) attached to an inner peripheral surface of the inner casing 33, and blades (not shown) attached to an outer peripheral surface of the rotor 36.

The inner casing 30 is formed from the Ni-based alloy high-chrome steel structure of the invention. As shown in FIG. 3, the inner casing 33 includes two Ni-based alloy portions 32a and 32b and one high-chrome steel portion 33.

The two Ni-based alloy portions 32a and 32b are joined together by welding to form a welded joint 42, and the Ni-based alloy portion 32b is joined to the high-chrome steel portion 33 by welding to form a welded joint 43, whereby the inner casing 31 is formed which is integrated in order of the Ni-based alloy portion 32a, the welded joint 42, the Ni-based alloy portion 32b, the welded joint 43, and the high-chrome steel portion 33 from one end.

Additionally, the Ni-based alloy portion 32a is provided so as to enclose the main steam pipe 35, and a surrounding high-temperature portion into which steam is introduced is formed from the Ni-based alloy portion 32a or 32b.

(Materials)

It is possible to form the Ni-based alloy portions 32a and 32b and the high-chrome steel portion 33 from the materials summarized in Table 1 and 2 like Example 1.

(Manufacturing Method)

It is possible to manufacture by the same method as Example 1 summarized in FIG. 2.

Here, since the low-chrome steel portion is not provided in Example 2 unlike Example 1, the first manufacturing method and the second manufacturing method, and the third manufacturing method and the fourth manufacturing method become the same in the (A) first manufacturing method, (B) second manufacturing method, (C) third manufacturing method, and (D) the fourth manufacturing method in Example 1, and it is possible to illustrate two types of manufacturing methods of 101→102→103→104→111→112→114 and 101→102→103→104→105→107 in FIG. 2.

INDUSTRIAL APPLICABILITY

The invention is able to be utilized as an Ni-based alloy high-chrome steel structure and its manufacturing method capable of joining the Ni-based alloys and the high-chrome steels by welding, and performing suitable heat treatment, thereby maintaining the strength in the joints.

The invention claimed is:

1. A manufacturing method of an Ni-based alloy high-chrome steel structure formed by joining together by welding at least two first members formed from Ni-based alloys, and joining a second member formed from high-chrome steels to a member where the first members have been joined together, the manufacturing method comprising the steps:

joining together the at least two first members formed from Ni-based alloys by welding;

performing a first-stage aging treatment on a welded joint between the first members, and then, joining the second member formed from high-chrome steels to the member where the first members have been joined together by welding; and then, performing second-stage aging treatment on the welded joint between the first members, and performing heat treatment after welding on a welded portion between the first members and the second member.

2. The manufacturing method of an Ni-based alloy high-chrome steel structure according to claim 1, wherein the temperature of the second-stage aging treatment performed on the welded joint between the first members, and the temperature of the heat treatment after welding performed on the welded portion between the first members and the second member are set to the same temperature, and the second-stage aging treatment and the heat treatment after welding are simultaneously performed.

3. The manufacturing method of an Ni-based alloy high-chrome steel structure according to claim 1, wherein the first-stage aging treatment of the welded joint between the first members is performed at 700 to 1000° C., and the second-stage aging treatment, and the heat treatment after welding of the welded portion between the first members and the second member are performed at 600 to 800° C.

4. The manufacturing method of an Ni-based alloy high-chrome steel structure according to claim 1,
wherein the at least two first members are joined together by welding;
the first-stage aging treatment on the welded joint between the first members is performed, and then the second member formed from high-chrome steels is joined to the member where the first members have been joined together by welding;
a third member formed from low-chrome steels is joined to the second member by welding; and then,
the second-stage aging treatment on the welded joint between the first members, the heat treatment after welding on the welded portion between the first members and the second member, and the heat treatment after welding on a welded portion between the second member and the third member are performed.

5. The manufacturing method of an Ni-based alloy high-chrome steel structure according to claim 4,
wherein the temperature of the second-stage aging treatment performed on the welded joint between the first members, the temperature of the heat treatment after welding performed on the welded portion between the first members and the second member, and the temperature of the heat treatment after welding performed on the welded portion between the second member and the third member are set to the same temperature, and
the second-stage aging treatment and each of the heat treatments after welding are simultaneously performed.

6. The manufacturing method of an Ni-based alloy high-chrome steel structure according to claim 4, wherein the first-stage aging treatment of the welded joint between the first members is performed at 700 to 1000° C., the second-stage aging treatment, and the heat treatment after welding of the welded portion between the first members and the second member, and the heat treatment after welding of the welded portion between the second member and the third member are performed at 600 to 800° C.

7. A manufacturing method of an Ni-based alloy high-chrome steel structure constructed by joining together at least two first members formed from Ni-based alloys by welding, and a second member formed from high-chrome steels to a member where the first members have been joined together, the manufacturing method comprising the steps:
joining together the at least two first members formed from Ni-based alloys by welding; and
performing a first-stage aging treatment and second-stage aging treatment on the welded joint between the first members, then joining the second member formed from high-chrome steels to the member where the first members have been joined together by welding, and performing heat treatment after welding on a welded portion.

8. The manufacturing method of an Ni-based alloy high-chrome steel structure according to claim 7, wherein the first-stage aging treatment of the welded joint between the first members is performed at 700 to 1000° C., and the second-stage aging treatment, and the heat treatment after welding of the welded portion between the first members and the second member are performed at 600 to 800° C.

9. An Ni-based alloy high-chrome steel structure formed by joining together at least two first members formed from Ni-based alloys by welding, and joining a second member formed from high-chrome steels to a member where the first members have been joined together,
wherein the structure is formed by joining together the at least two first members formed from Ni-based alloys by welding; performing first-stage aging treatment on a welded joint between the first members, and then, joining the second member formed from high-chrome steels to the member where the first members have been joined together by welding; and, performing second-stage aging treatment on the welded joint between the first members, and performing heat treatment after welding on a welded portion between the first members and the second member.

10. The Ni-based alloy high-chrome steel structure according to claim 9,
wherein the structure is formed by setting the temperature of the second-stage aging treatment performed on the welded joint between the first members, and
the temperature of the heat treatment after welding performed on the welded portion between the first members and the second member to the same temperature, and simultaneously performing the second-stage aging treatment and the heat treatment after welding.

11. The Ni-based alloy high-chrome steel structure according to claim 9,
wherein the structure is formed by performing the first-stage aging treatment of the welded joint between the first members at 700 to 1000° C., and performing the second-stage aging treatment, and the heat treatment after welding of the welded portion between the first members and the second member at 600 to 800° C.

12. The Ni-based alloy high-chrome steel structure according to claim 9,
wherein the structure is formed by joining together the at least two first members by welding; performing the first-stage aging treatment on the welded joint between the first members, then joining the second member formed from high-chrome steels to the member where the first members have been joined together by welding, and joining a third member formed from low-chrome steels to the second member by welding; and
performing the second-stage aging treatment on the welded joint between the first members, the heat treatment after welding on the welded portion between the first members and the second member, and the heat treatment after welding on a welded portion between the second member and the third member.

13. The Ni-based alloy high-chrome steel structure according to claim 12,
wherein the structure is formed by setting the temperature of the second-stage aging treatment performed on the welded joint between the first members, the temperature of the heat treatment after welding performed on the welded portion between the first members and the second member, and the temperature of the heat treatment after welding performed on the welded portion between the second member and the third member to the same temperature, and
simultaneously performing the second-stage aging treatment and each of the heat treatments after welding.

14. The Ni-based alloy high-chrome steel structure according to claim 12,
wherein the structure is formed by performing the first-stage aging treatment of the welded joint between the first members at 700 to 1000° C., and performing the second-stage aging treatment, the heat treatment after welding of the welded portion between the first members and the second member, and the heat treatment after welding of the welded portion between the second member and the third member at 600 to 800° C.

15. The Ni-based alloy high-chrome steel structure according to claim 9,
wherein the structure is used for the configuration of a rotor or casing of a rotary appliance into which a working fluid that is steam or combustion gas is introduced.

16. An Ni-based alloy high-chrome steel structure constructed by joining together at least two first members formed from Ni-based alloys by welding, and a second member formed from high-chrome steels to a member where the first members have been joined together,
wherein the structure is formed by joining together the at least two first members formed from Ni-based alloys by welding; and performing first-stage aging treatment and second-stage aging treatment on the welded joint between the first members, then joining the second member formed from high-chrome steels to the member where the first members have been joined together by welding, and performing heat treatment after welding on a welded portion.

17. The Ni-based alloy high-chrome steel structure according to claim 16,
wherein the structure is formed by performing the first-stage aging treatment of the welded joint between the first members at 700 to 1000° C., and performing the second-stage aging treatment, and the heat treatment after welding of the welded portion between the first members and the second member at 600 to 800° C.

18. The Ni-based alloy high-chrome steel structure according to claim 16,
wherein the structure is used for the configuration of a rotor or casing of a rotary appliance into which a working fluid that is steam or combustion gas is introduced.

* * * * *